United States Patent [19]

Carty et al.

[11] 4,086,296

[45] * Apr. 25, 1978

[54] BLENDS OF THERMOPLASTIC POLYMER WITH A MULTI-PHASE ACRYLIC COMPOSITE POLYMERS

[75] Inventors: Daniel T. Carty, Willingboro, N.J.; James A. Oline, Wyncote, Pa.

[73] Assignee: Rohm and Haas Company, Philadelphia, Pa.

[*] Notice: The portion of the term of this patent subsequent to Jan. 7, 1992, has been disclaimed.

[21] Appl. No.: 532,350

[22] Filed: Dec. 13, 1974

Related U.S. Application Data

[63] Continuation-in-part of Ser. No. 299,492, Oct. 20, 1972, Pat. No. 3,859,384, which is a continuation-in-part of Ser. No. 108,177, Jan. 20, 1971, abandoned, which is a continuation-in-part of Ser. No. 55,979, Jul. 17, 1970, abandoned.

[51] Int. Cl.$^2$ .................. C08L 77/00; C08F 15/00
[52] U.S. Cl. ................ 260/857 G; 260/23 ST; 260/23 AR; 260/17 R; 260/23 XA; 260/31.6; 260/31.8 M; 260/859 R; 260/873; 260/876 R; 260/884; 260/885; 260/886; 260/899; 260/901
[58] Field of Search ............... 260/876 R, 885, 873, 260/859 R, 857 G

[56] References Cited

U.S. PATENT DOCUMENTS

| | | | |
|---|---|---|---|
| 3,041,306 | 6/1962 | Baer | 260/45.5 |
| 3,041,308 | 6/1962 | Baer | 260/45.5 |
| 3,041,309 | 6/1962 | Baer | 260/45.5 |
| 3,251,904 | 5/1966 | Souder et al. | 260/876 R |
| 3,488,743 | 1/1970 | Baer et al. | 260/879 |
| 3,859,384 | 1/1975 | Carty et al. | 260/876 R |

*Primary Examiner*—Richard B. Turer
*Attorney, Agent, or Firm*—Michael B. Fein

[57] ABSTRACT

Blends of the thermoplastic polymers and a multiphase acrylic composite polymer comprising (A) a first non-crosslinked phase of molecular weight of about 7,500 to 50,000 polymerized from a first monomer emulsion or solution of at least 25 weight percent of at least one alkyl acrylate, wherein said alkyl group has 1 to 18 carbon atoms, 0 to 75 weight percent of another acrylic monomer and 0 to 75 weight percent of another copolymerizable ethylenically unsaturated monomer, and (B) a final rigid thermoplastic phase polymerized in the presence of the first phase from an emulsion or solution of about 35 to 100 weight percent of at least one monomer which is a methacrylate, acrylate, styrene or substituted styrene, 0 to 60 weight percent of another acrylic monomer, and 0 to 65 weight percent of another copolymerizable ethylenically unsaturated monomer, wherein the rigid thermoplastic phase has a molecular weight of from about 400,000 to about $5 \times 10^6$. The polymer is useful as a processing aid and lubricant in a wide variety of plastics.

12 Claims, No Drawings

BLENDS OF THERMOPLASTIC POLYMER WITH A MULTI-PHASE ACRYLIC COMPOSITE POLYMERS

This application is a continuation-in-part of Ser. No. 299,492 of Oct. 20, 1972, now U.S. Pat. No. 3,859,384 of Jan. 7, 1975 which was a continuation-in-part of Ser. No. 108,177 of Jan. 20, 1971, now abandoned, which was in turn a continuation-in-part of Ser. No. 55,979, filed July 17, 1970, now abandoned. This application is related to Ser. No. 426,973 of Dec. 20, 1973, now U.S. Pat. No. 3,859,389 of January 7, 1975.

This invention relates to new acrylic multiphase composite polymers which function as lubricants and/or processing aids in a wide variety of thermoplastic polymers. These lubricating processing aids are solids at room temperatures, and are incorporated into the thermoplastic polymer to be modified by blending.

Conventionally, styrene/acrylonitrile copolymers or styrene/alkyl methacrylate interpolymers have been used to improve the processing characteristics of vinyl halide polymers during operations such as milling, calendering or the like as exemplified by Jennings, U.S. Pat. No. 3,646,417 and Schwaegerle, U.S. Pat. No. 2,791,600. In order to increase production and, in some cases, to produce a product of particular desirable properties which are promoted by rapid operation, it is often desirable to conduct milling, calendering or like operations at higher than conventional rates. Such higher rates of operation however are accomplished by higher temperatures — temperatures at which the conventional aids begin to lose their process-lubricating qualities. As a result, the vinyl halide polymer develops a tendency to adhere to equipment surfaces. It has been found that the modifiers of the present invention, which are alkyl acrylate-hard phase composite polymers of particular compositions and properties, when added to vinyl halide polymers, impart superior mill roll release at high temperatures and resistance to "plate out."

Souder et al., U.S. Pat. No. 3,251,904, show a polyvinyl chloride (PVC) modifier of (I) 60 to 25 parts of methyl methacrylate or methyl methacrylate and another monomer and (II) 40 to 75 parts alkyl acrylate polymers or polymers of an alkyl acrylate and another monomer. Netherlands 69/05725 (Monsanto) shows a modifier of PVC that is an alkyl acrylate homopolymer and/or a copolymer of 5 to 95 weight percent alkyl acrylate and 95 to 65 weight percent of another alkyl acrylate as a processing aid. United States pending application, Ser. No. 31,754 filed 4/24/70, Ryan, describes a PVC modifier which comprises a first crosslinked acrylic elastomer phase and a second acrylic rigid phase. The modifier imparts low die swell characteristics to the PVC. United States pending application, Ser. No. 42,882, Whang, shows polymeric modifiers of molecular weights of from 1,500 to less than 10,000 containing the residue of (A) from 75 to 100 percent by weight alkyl methacrylate and (B) from 0 to 25 percent of at least one ester of acrylic or methacrylic acid, styrene or substituted styrene.

The lubrication of various other thermoplastic polymers by use of a liquid homopolymer of an alkyl acrylate or a liquid copolymer of two alkyl acrylates is taught by Coaker et al., U.S. Pat. No. 3,809,667. However, these liquid modifiers are hard to handle, are not isolatable by spray drying techniques, are not incorporatable by dry blending techniques which are the art-accepted way to incorporate modifiers in thermoplastics and do not adequately improve the release of thermoplastics from hot metal surfaces. Also, the Coaker et al modifiers operate by a substantial reduction in the melt viscosity of the thermoplastic, which is often considered undesirable in the art, as the manufacturer has to make severe adjustments in his processing conditions and/or equipment.

Accordingly, it is an object of the present invention to provide a modifier for thermoplastic polymers which provides improved lubricating properties.

It is another object to provide a modifier which improves the processing properties of thermoplastic polymers.

A further object is to provide an acrylic modifier which is solid at room temperature and can be dry blended.

These and other objects as will become apparent are achieved by the present invention which comprises a blend of a thermoplastic polymer with a multiphase acrylic composite polymer comprising (A) a first non-crosslinked "soft" phase of molecular weight of about 7,500 to 50,000 polymerized from a first monomer emulsion or solution of at least 25 weight percent of at least one alkyl acrylate wherein the alkyl group has 1 to 18 carbon atoms, 0 to 75 weight percent of another acrylic monomer, and 0 to 75 percent of another copolymerizable ethylenically unsaturated monomer, and (B) a final, rigid thermoplastic phase polymerized in the presence of the elastomer phase from a second monomer emulsion or solution of about 35 to 100 weight percent of at least one monomer which is a methacrylate, acrylate, styrene or substituted styrene, 0 to 65 weight percent of another acrylic monomer, and 0 to 65 weight percent of another copolymerizable ethylenically unsaturated monomer, wherein the rigid thermoplastic phase has a molecular weight of from 400,000 to about $5 \times 10^6$.

The composite polymer material is ordinarily and preferably prepared by emulsion polymerization of the first phase as a discrete phase from a monomer composition of at least 25 weight percent of an alkyl acrylate with an alkyl groups of 1 to 18 carbon atoms. Upon completion of the polymerization of the first phase, i.e., substantial exhaustion of the monomers in the initial polymerization composition, the rigid thermoplastic phase is then formed by polymerization in the presence of the first phase, in the same emulsion from a monomer mix comprising at least about 35 weight percent of a methacrylate, acrylate, styrene or substituted styrene monomer. The polymerization of the rigid thermoplastic phase of the composite is preferably conducted in such a fashion that substantially all of the rigid phase material is formed on or near the surface of the first phase as hereinafter more fully described, and without the formation of substantial numbers of new particles in the emulsion.

The first stage of the polymers of the present invention may be polymerized from a mixture containing 25 to 100, preferably 35 to 45, weight percent of at least one alkyl acrylate wherein the alkyl group has 1 to 12 carbon atoms. Preferred alkyl acrylates include butyl acrylate, ethyl acrylate and 2-ethylhexyl acrylate.

The first or "soft" phase may be polymerized from a monomer emulsion or solution containing 0 to 75 weight percent of another acrylic monomer or between 35 to 65 weight percent of another monomer which may be acrylonitrile, methacrylonitrile, vinyl acetate, acrylic acid, methacrylic acid, acrylamide, methacrylamide, N-methylol acrylamide, octyl acrylate, chloroethyl acrylate, alkylthioalkyl acrylates such as ethylthioethyl acrylate, and the like, alkoxyalkyl acrylates such as methoxyethyl acrylate, and the like, and alkyl methacrylates wherein the alkyl groups contain 4 to 12 carbon atoms and others.

The monomer emulsion or solution which is polymerized to the first phase may also contain 0 to 75 weight percent, or between 35 to 65 weight percent of another copolymerizable ethylenically unsaturated monomer. Such copolymerizable monomers include styrenes such as styrene, p-chlorostyrene, nitrostyrene, and α-methyl styrene; vinyl toluene; alkyl vinyl esters; alkyl vinyl ketones; chloroethyl vinyl ethers, and the like.

Most preferred soft stages within the scope of the present invention include acrylic interpolymer prepared from monomer mixtures comprising about 35 to 100 parts by weight butyl acrylate and ethyl acrylate monomers, about 0 to 64 parts by weight other acrylic monomers, and about 0 to 65 parts by weight of other non-acrylic ethylenically unsaturated monomers. An example of a most preferred soft stage is a polymer of about less than 40 percent by weight butyl acrylate, about less than 60 percent styrene, about 3 percent methyl methacrylate and less than 1 percent ethyl acrylate.

A preferred molecular weight range for the first phase of the multiphase acrylic composite interpolymer of this invention is 7,500 or more preferably 10,000 to 50,000 to 75,000. Unless otherwise noted in this specification, the term "molecular weight" refers to viscosity average molecular weight ($M_v$). The elastomeric phase of the multiphase acrylic composite interpolymers of this invention may be defined in terms of this characteristic. It should be noted that although the characteristic molecular weight range for the present elastomers is a critical feature of the present invention, novelty resides, not here alone, but rather in the manner in which this feature interdependently and cooperatively combines with the final rigid thermoplastic phase to produce a modifier which imparts to various plastics the surprising characteristics of superior mill roll release and resistance to plate out. It has also been found that the multiphase acrylic composite interpolymers, in addition to imparting mill roll release and resistance to plate-out, additionally may provide a system of excellent clarity. Furthermore, the present modifiers are easily isolated through spray drying and are quite suitable for powder blending.

The rigid thermoplastic phase of the composite interpolymer of the present invention includes the acrylic thermoplastic polymerized from monomer mixtures comprising 35 to 100 weight percent of at least one monomer which is a methacrylate, acrylate, styrene or substituted styrene, one or more acrylic comonomers in quantities of 0 to 65 weight percent, and 0 to 65 weight percent of another ethylenically unsaturated monomer. The thermoplastic phase may be polymerized from a monomer mixture containing 50 to 90 weight of at least one monomer which is the methacrylate, acrylate, styrene or substituted styrene. Suitable methacrylates and acrylates include alkyl and aryl esters of methacrylic and acrylic acid wherein the alkyl group may be straight chain, branched chain, or cycloalkyl. The cycloalkyl group may be either bridged or unbridged. The term "aryl" includes aralkyl and alkaryl groups which may be substituted, if desired, or both the aliphatic portions and on the aromatic portions. The alkyl acrylates and methacrylates usually include those wherein the alkyl group contains 1 to 18 carbon atoms and to cycloalkyl arcylates are usually those wherein the cycloalkyl group contains 4 to 10 carbon atoms. In the preferred alkyl acrylates and methacrylates, the alkyl groups contain 1 to 4 carbon atoms. Examples of alkyl- and aryl- methacrylates and acrylates include methyl methacrylate, ethyl methacrylate, n-propyl methacrylate, isopropyl methacrylate, n-butyl methacrylate, isobutyl methacrylate, stearyl methacrylate, phenyl methacrylate, benzyl methacrylate, cyclohexyl methacrylate, isobornyl methacrylate, norbornyl methacrylate, fenchyl methacrylate, isofenchyl methacrylate, bornyl methacrylate, the corresponding acrylates and the like. Suitable substitutions on these methacrylates include halogen (e.g. chlorine), hydroxy, alkoxy (e.g. methoxy), alkylthio (e.g. ethylthio), cyano, and the like.

When substituted styrene is utilized as a component, the substituents usually are from about 1 to 5, preferably about 1 to 3 carbon atoms in chain length, but may be other non-deleterious substituents. Exemplary of the unsubstituted styrenes useful in the acrylate polymers of the present invention are α-methyl styrene, chlorostyrene, α-hydroxy methyl styrene, and the like. Exemplary substitutents for such compounds are halogens, hydroxy groups, alkoxy groups, as well as lower alkyl groups, etc.

The rigid thermoplastic phase is polymerized from monomer mixtures containing 0 to 65 weight percent or 5 to 15 weight percent of other acrylic comonomers such as other alkyl and aryl methacrylates, alkyl and aryl acrylamides, substituted alkyl and aryl acrylic and methacrylic monomers, where the substituents can be halogen, alkoxy, alkylthio, cyanoalkyl, amino, alkylthio, and other like substituents. The final rigid phase is prepared from monomer mixtures which also contain 0 to 65 or 5 to 15 weight percent of another ethylenically unsaturated monomer which imparts a rigid character to the rigid phase, such as vinyl aromatics, preferably styrene and α-methylstyrene, vinyl and vinylidene halides, and vinyl-substituted nitriles, vinyl esters, vinyl ethers, vinyl amides, vinyl ketones, olefins, and the like.

An example of multiphase acrylic composite polymer for the purpose of this invention is the product of the polymerization of a mixture of about 60 weight percent soft stage polymer, about 35 percent methyl methacrylate, about 4 percent ethyl acrylate, less than about 1 percent butyl acrylate and less than about 1 percent styrene.

The rigid phase is further characterized by molecular weight ranging from about 400,000 to $5 \times 10^6$, preferably 750,000 to $3 \times 10^6$. A particularly effective molecular weight for attaining the full benefits of the present invention is about 750,000 to $1 \times 10^6$, which level is also relatively convenient to attain in preparing the composite interpolymers of the present invention.

The modified compositions of the present invention may contain from 75 to 99.9 percent by weight of a thermoplastic polymer modified with from about 0.1 to 25 percent by weight of the multiphase acrylic composite interpolymer modifier. Usually, however, and particularly when the modified compositions are used in a milling or calendering operation, the amount of modifier varies from 1 to about 10 percent by weight, preferably about 2 to 4 percent by weight. The modifiers of this invention comprise from 50 to 90 percent by weight of the lower alkyl acrylate-containing phase, from 10 to 50 percent by weight of the final rigid thermoplastic phase. In its preferred composition, the modifiers of the present invention contain from 50 to 70 percent by weight of the first phase and from 30 to 50 percent by weight of the thermoplastic phase.

The composite acrylic interpolymers of the present invention are prepared by solution, suspension or emulsion polymerization procedures utilizing a multi-stage or sequential technique. In simplest form, the first phase is formed in an initial stage and the rigid thermoplastic phase is formed in a second stage. Either the first or rigid phases can themselves also be sequentially polymerized. The monomers of the initial stage, together with polymerization initiators, soap or emulsifiers polymerization modifiers and chain transfer agents and the like are formed into the initial polymerization mix and polymerized, e.g. by heating and mixing the emulsion, in well known and wholly conventional fashion, until the monomers are substantially depleted and a seed polymer is formed. Monomers of the second, and in turn, of each additional stage are then added with appropriate other materials, e.g., supplementary initiators, soap, modifiers, and the like, so that the desired polymerization of each stage occurs in sequence to substantial exhaustion of the monomers. In each stage subsequent to the first, the amounts of the initiators and soap, if any, are maintained at a level such that polymerization occurs at or near the surface of the existing particles, and no substantial number of new particles, or seeds, form in the emulsion. When the phases of the composite interpolymer are either themselves formed by sequential polymerization, the monomer constituents of the various stages of each phase may vary from stage to stage, or all the components can be present throughout the entire phase polymerization. The stages can vary in hardness, from a very soft elastomer first stage seed to the hardest rigid thermoplastic. Both the elastomer and the rigid thermoplastic can contain chain transfer agents, in one or all stages, and, if desired the rigid thermoplastic stage can contain polyfunctional crosslinking monomers. However, it is a characteristic of the present invention that the first "soft" stage is non-crosslinked. What is meant by the term "non-crosslinked" is that no cross linking monomers are present in the elastomer stage.

A preferred technique is the use of a chain transfer agent such as an alkyl mercaptan in the polymerization mix of the first stage or stages in which the elastomeric phase is polymerized. Suitable chain transfer agents in this invention include the $C_4$ to $C_{12}$ and higher alkyl mercaptans particularly n-dodecyl mercaptan. Other techniques for controlling molecular weight of the elastomeric phase include the use of peroxide, operations at high temperatures or the use of allyl compounds.

The polymerization reactions can be initiated by either thermal or redox type initiator systems. Examples of thermal initiators include the organic peroxides, such as benzoyl peroxide, substituted benzoyl peroxides, acetyl peroxides, lauroyl peroxide, t-butyl hydroperoxide, di-t-butyl hydroperoxide, peresters, such as t-butyl peroxypivalate, azo-type initiators such as azo-bis-isobutyronitrile, persulfates, such as sodium, potassium or ammonium persulfate, and peroxyphosphates such as sodium, potassium, or ammonium peroxyphosphate. Redox initiators are generally a combination of a hydroperoxide, such as hydrogen peroxide, t-butylhydroperoxide, cumene hydroperoxide, di-isopropylbenzene hydroperoxide, and the like, with a reducing agent, such as sodium, potassium, or ammonium bisulfite, metabisulfite, or hydrosulfite, sulfur dioxide, hydrazine, ferrous salts, ascorbic acid, sodium formaldehyde sulfoxylate and the like, as are well known in the art.

Examples of emulsifiers or soaps suited to polymerization processes of the present invention include alkali metal and ammonium salts of alkyl, aryl, alkaryl, and aralkyl sulfonates, sulfates and polyether sulfates, ethoxylated fatty acids, esters, alcohols, amines, amides, alkyl phenols, complex organophosphoric acids and their alkali metal and ammonium salts.

Blends of the composite interpolymer and the thermoplastic resin can be accomplished by any convenient technique. Entirely satisfactory blends can be accomplished on a roll mill at convenient and customary operating conditions, such as about 350° F. in about 5 minutes or less time. Dry mixing techniques, as with a mechanical mixer-blender device, can also be employed, and are preferred since they are the methods generally accepted in the art for incorporation of modifiers and additives in thermoplastics. The powder blends can, if desired, be processed in commercial extrusion equipment at varying conditions.

The utility of the present class of multiphase acrylic polymers in processing of plastics includes vinyl halide polymers as well as the ABS resins, wherein styrene/acrylonitrile copolymers are grafted onto and/or blended with butadiene, butadiene/styrene or butadiene/acrylonitrile rubbers. The modifiers of the present invention are useful in the processing of ABS resin, improving the time before mill sticking occurs, improving surface gloss and appearance, and lengthening the time before polymer buildup on injection molding equipment leads to noticeable effects on moldable parts. Similar effects are seen in related thermoplastics, such as rubber modified or "high impact" polystyrene, chlorinated poly(vinyl chloride), polystyrene, poly(methyl methacrylate), so-called "barrier resins" based on acrylonitrile copolymers, cellulose acetate butyrate, polypropylene, and high density polyethylene, to name but a few.

A second class of thermoplastics, generally requiring higher processing temperatures and more narrowly controlled temperature conditions, are the polyester and polyamide resins. Exemplary of these are polyethylene terephthalate and poly (caprolactam). The subject multiphase acrylic polymers are not only useful in processing these materials, but they show utility in the manufacture of fibers. The polymeric additive allows processing at lower temperatures without deleterious effect on fiber properties.

Polycarbonates can also be improved as to lubricity and processing by the modifiers of the present invention.

The additives of this invention are also useful in the processing of polyurethanes, both as thermoplastic rubbers, where better release from processing equipment occurs, and in the injection molding of polyurethanes where the polymer is formed and foamed during molding, where release from mold surfaces can be aided by the presence of the subject additive.

Certain stabilizers and the like are often incorporated in the blends. The stabilizers which serve to prevent the breakdown of the thermoplastic polymer are of several different types, including both varieties which stabilize against thermal and ultraviolet light stimulated oxidative degradation, discoloration and the like.

In a particularly notable aspect of the present invention, it has been found that in applications what would otherwise require the thermoplastic polymer to be modified with conventional lubricants, polymers containing the modifiers of the present invention may be used without any of these other conventional lubricants. Certain known lubricants may impart improved processability to thermoplastic such as polyvinyl halides at high temperatures but these lubricants adversely affect clarity of the polymers. This point will be illustrated in the examples of this specification by a comparison between compositions containing a conventional lubricant and compositions containing the acrylic composite interpolymer of this invention.

Other inclusions of the blends prepared in accordance with the present invention include colorants, including organic dyes, such as anthraquinone red, and the like, organic pigments and lakes such as phthalocyanine blue and the like, and inorganic pigments such as titanium dioxide, cadmium sulfide, and the like; fillers and particular extenders such as carbon black, amorphous silica, asbestos, glass fibers, magnesium carbonate, and the like; plasticizers such as dioctyl phthalate, dibenzyl phthalate, butyl benzyl phthalate, hydrocarbon oils, and the like; and impact modifiers such as typical methacrylate/butadiene/styrene modifiers and others.

While only a few of such materials have been specifically recited, it is not intended to exclude others; the recitation is exemplary only, and each category of additives is common and well-known in the art, including extremely large numbers of materials which are equally well suited for inclusion in the materials of the present invention.

Such inclusions can be made at any stage of preparation in accordance with accepted techniques well-known to those ordinarily skilled in the art, in proportions which are commonly employed. Such additional materials are not of particular significance in the present invention and form no part thereof.

To assist those skilled in the art in the practice of the present invention, the following modes of operation are set forth as illustrations, parts and percentages mean by weight unless otherwise specifically noted:

EXAMPLE I

The following procedure illustrates a process for making the multiphase acrylic composite polymers of the present invention. The polymer illustrated is characterized by a butyl acrylate/styrene (40/60) first stage and a methyl methacrylate/ethyl acrylate (45/5) second stage value where the ratio of the first stage to the second stage is 1/1.

Two parts of acetic acid (5% aqueous solution) and 881 parts of distilled water are mixed under nitrogen with stirring. The temperature is adjusted to 40° C. and 82 parts of a monomer mixture is added. The monomer mixture contains 5 parts acetic acid (5% aqueous solution), 3.5 parts of a 20% aqueous solution of sodium lauryl sulfate, 1.5 parts of an 80% concentrate of the primary phosphate of octylphenoxypolyethyoxyethanol in water, 170 parts of distilled water, 15 parts n-dodecyl mercaptan, 200 parts n-butyl acrylate, 300 parts of styrene and 5 parts cumene hydroperoxide. A solution (26 parts) of 1 part sodium sulfoxylate formaldehyde in 25 parts water is added and the nitrogen sparge is reduced. After 1.5 hours an additional 618 parts of the above monomer mix are added. After the reaction is completed, the product is filtered and the emulsion is evaporated in a vacuum over for 2 to 3 days at 60° C. to give a semi-solid material, $[\eta]$ acetone $=0.11$.

Distilled water, 484 parts and 796 parts of an emulsion of the previously-prepared polymer (250 parts solids) are mixed under nitrogen sparge. The temperature is adjusted to 44°–45° C. and a solution (26 parts) of 1 part sodium sulfoxylate formaldehyde in 25 parts water is added. A monomer mixture, 359.63 parts, is then added to the reaction mixture over a period of about one hour. The mixture contains 1.25 parts of an 80% concentrate of the primary phosphate of octylphenoxypolyethoxyethanol in water, 108 parts of distilled water, 225 parts methyl methacrylate, 25 parts ethyl acrylate and 0.38 parts cumene hydroperoxide. The resulting product (butyl acrylate/styrene//methyl methacrylate/ethyl acrylate; 20/30//45/5) is cooled and filtered through cheesecloth. An aliquot of the emulsion is evaporated in a vacuum oven for 2 to 3 days at 60° C. to yield a solid of $[\eta]$ acetone $=0.78$. The balance of the emulsion is spray dried with good recovery and good product to dusting ratio.

EXAMPLE II

The composition prepared in Example I and other polymers indicated in Table I and prepared according to the same general procedure are incorporated into polyvinyl halide compositions by the following procedure:

One hundred grams of a hand mixture of 97 parts of a polyvinyl chloride, 3 parts of the modifier indicated in the Table I, 2 parts of a tin stabilizer, and 1.0 parts lubricants, is blended at 26/20 rpm. for 3 minutes at 350° F. The mixture is then formed into sheet by milling, 3 minutes at 425° F. 21/20 rpm. The sheets are compression molded into ⅛ inch thick slabs at 350° F. according to a cycle of three minute preheat, two minutes at 70 tons pressure followed by three minutes cooling under pressure. During the high temperature milling operation, the samples are rated for roll release according to the following system:

| P (poor) | only edges of stock can be removed with difficulty |
| F (fair) | larger portions of the stock can be removed |
| G (good) | most of the stock can be removed with some difficulty |
| E (excellent) | entire stock can be removed with no sticking |

These samples are also rated for mill stability and clarity of final sheet according to standard tests.

TABLE I

| Composition | Intrinsic Viscosity in Acetone | Roll Release At 1 Min | Roll Release At 3 Min | Mill Stability Min. to Color | Mill Stability Co. or at 3 Min | Clarity Percent WL | Clarity Percent Haze |
| --- | --- | --- | --- | --- | --- | --- | --- |
| Unmodified Polyvinyl Chloride |  | F− | P− | 1¼ | yellow | 80.0 | 11.2 |
| A | 0.78 | E+ | E+ | 1¼ | yellow | 79.5 | 14.2 |
| B | 0.11 | E+ | E+ | 1¼ | yellow | 80.2 | 13.2 |
| C |  | F+ | P+ | 1¼ | yellow | 70.0 | 15.0 |
| D | 0.83 | E+ | E+ | 1¼ | yellow | 79.0 | 12.3 |
| D | 0.87 | E+ | E+ | 1¼ | yellow | 80.5 | 11.8 |
| D | 1.0 | E+ | E+ | 1¼ | yellow | 81.2 | 15.1 |
| D | 0.84 | E+ | E+ | 1¼ | yellow | 70.0 | 18.9 |
| D | 0.91 | E+ | E+ | 1¼ | yellow | 78.4 | 9.9 |
| D | 1.0 | E | G− | 1¼ | yellow | 78.0 | 15.1 |
| D | 1.3 | G+ | G | 1¼ | yellow | 70.8 | 12.9 |
| D | 1.3 | G− | G− | 1¼ | yellow | 82.2 | 8.2 |
| D | 1.3 | G− | G− | 1¼ | yellow | 82.2 | 8.2 |

Composition A contains the modifier prepared in Example I, B contains a low molecular weight ($M_v \sim 14{,}000$) polybutyl acrylate/N-vinyl pyrrolidone; 95/5, C contains a styrene/butyl acrylate; 60/40 copolymer modifier, and D contains a styrene/butyl acrylate first stage//methyl methacrylate second stage; 30/20/50.

EXAMPLE III

Various modified polyvinyl chloride compostions are prepared by milling 100 grams of mixtures and modifier and polyvinyl chloride for five minutes at 425° F., 21/20 rpm. roll sheets followed by compression molding into ⅛ inch thick slabs at 350° F. according to a cycle of a three-minute preheat; two minutes compression at 70 ton pressure followed by three minutes cooling under pressure. Table II shows processing results and clarity determinations for the various modified compositions indicated.

and are tested for roll release and mill stability at 425° F. and 380° F. with the results as shown in Tables IV and V.

Table III

| | Composition | | Ratio of First Stage/ Final Stage | Intrinsic Viscosity In Acetone First Stage | Intrinsic Viscosity In Acetone for Polymer |
|---|---|---|---|---|---|
| | First Stage | Final Stage | | | |
| A | styrene/butyl acrylate; 30/20 | methyl methacrylate/ethyl acrylate 45/5 | 50/50 | 0.11 | 0.96 |
| B | styrene/butyl acrylate; 36/24 | methyl methacrylate/ethyl acrylate 36/4 | 60/40 | 0.13 | 0.91 |
| C | styrene/butyl acrylate; 42/28 | methyl methacrylate/ethyl acrylate 27/3 | 70/30 | 0.12 | 0.53 |

Table II

| | | Processing | | | | | Clarity | |
|---|---|---|---|---|---|---|---|---|
| Composition | Intrinsic Viscosity In Acetone | Flex Time (Minutes) | Rolling Bank | Hot Strength | Thermoplasticity | Release | Percent White Light Transmission | Percent Haze |
| Unmodified Polyvinyl Chloride | | 2 | F | F | F | G | 86.4 | 5.7 |
| A | 0.83 | 2 | G+ | G+ | G | E | 84.0 | 6.0 |
| A | 0.87 | 2 | G+ | G+ | G+ | E | 87.0 | 6.9 |
| A | 1.0 | 2 | G+ | G+ | G | E | 87.5 | 4.9 |
| A | 0.84 | 2 | G+ | G+ | G+ | E− | 86.0 | 7.6 |
| A | 0.91 | 1½ | G+ | G+ | G+ | E− | 89.0 | 5.1 |
| A | 1.0 | 1½ | G+ | G+ | G | E− | 87.5 | 6.5 |
| A | 1.3 | 1½ | G+ | G+ | G | E− | 83.0 | 10.6 |
| A | 1.3 | 1½ | G+ | G+ | G+ | E− | 84.6 | 9.0 |
| A | 1.7 | 1½ | G+ | G+ | G+ | E− | 86.2 | 5.8 |
| B | | 1½ | G | G | F+ | E+ | 84.5 | 5.9 |
| C | 0.11 | 3 | F+ | F+ | F+ | E+ | 85.0 | 9.4 |
| D | 0.96 | 2 | G+ | G | G | E+ | 87.0 | 5.7 |

Composition A contains a 30 parts styrene/20 parts butyl acrylate first stage and a 50 parts methyl methacrylate second stage polymeric modifier, composition B contains a low molecular weight ($M_v \sim 14{,}000$) polybutyl acrylate, C contains a styrene/butyl acrylate; 60/40 copolymer modifier and D contains a 30 parts styrene/20 parts butyl acrylate first stage and a 45 parts methyl methacrylate/5 parts ethyl acrylate second stage polymeric modifier. Compositions A and D are prepared in accordance with the procedure of Example I except that where necessary to control molecular weight, a small percentage of n-dodecylmercaptan is added to the first stage monomer mixture.

This example illustrates the effect of varying molecular weight on processing and compositional properties.

EXAMPLE IV

In this example, the polymers shown in Table III are prepared in accordance with the procedure of Example I. The polymers are then incorporated into polyvinyl chloride compositions by the procedure of Example II

| Sample | Stage I [η]acetone | $M_v \times 10^{-4}$ | Stage II [η]acetone | $M_v \times 10^{-6}$ |
|---|---|---|---|---|
| A | 0.11 | 1.8 | 0.96 | 1.62 |
| B | 0.13 | 1.9 | 0.91 | 1.91 |
| C | 0.12 | 1.85 | 0.53 | 1.02 |

Table IV

| Composition | Percent of Total Polyvinyl Chloride Composition | Roll Release At 1 Minute | Roll Release At 3 Minute | Mill Stability Minutes to Color | Mill Stability Color at 3 Minutes |
|---|---|---|---|---|---|
| Unmodified Polyvinyl Chloride | | P | P− | 1 | orange |
| A | 1 | E− | G | 1½ | yellow |
| A | 2 | G+ | G | 1½ | yellow |
| A | 3 | E− | E | 1½ | yellow |
| B | 1 | E | G+ | 1½ | yellow + |
| B | 2 | E | E+ | 1½ | yellow |
| B | 3 | E− | E+ | 1½ | yellow |
| C | 1 | E− | E | 1½ | yellow + |
| C | 2 | E− | E+ | 1½ | yellow |
| C | 3 | E− | E+ | 1½ | yellow |

Table V

| Composition | Percent of Polyvinyl Chloride Composition | Processing Flex Time (Minutes) | Rolling Bank | Hot Strength | Thermo-plasticity | Release | Clarity Percent White Light Transmission | Percent Haze | Static Heat Stability, 380° C. Minutes to Color | Minutes to Char |
|---|---|---|---|---|---|---|---|---|---|---|
| Unmodified Polyvinyl Chloride | | ¼–½ | F | F | F | G | 75.8 | 16.2 | 10 | 80 |
| A | 1 | ¼–½ | F+ | F+ | F+ | G | 81.1 | 10.6 | 20 | 90 |
| A | 3 | ¼–½ | F+ | G− | G− | G | 79.0 | 12.7 | 20–30 | >90 |
| A | 5 | ¼–½ | F+ | G | G | G | 81.1 | 13.1 | 20–30 | >90 |

Table V-continued

| Composition | Percent of Polyvinyl Chloride Composition | Processing | | | | | Clarity | | Static Heat Stability, 380° C. | |
| --- | --- | --- | --- | --- | --- | --- | --- | --- | --- | --- |
| | | Flex Time (Minutes) | Rolling Bank | Hot Strength | Thermo-plasticity | Release | Percent White Light Transmission | Percent Haze | Minutes to Color | Minutes to Char |
| B | 1 | ½-¾ | F+ | F+ | F+ | G | 79.6 | 12.6 | 10-20 | 90 |
| B | 3 | ½-¾ | F+ | G− | G− | G | 80.5 | 13.1 | 20-30 | >90 |
| B | 5 | ½-¾ | F+ | G | G | G | 84.1 | 7.3 | 20-30 | >90 |
| C | 1 | ½-¾ | F+ | F+ | F | G | 83.5 | 8.4 | 10-20 | 90 |
| C | 3 | ½-¾ | F+ | F+ | F+ | G | 81.6 | 9.6 | 20-30 | >90 |
| C | 5 | ½-¾ | F+ | F+ | F | G | 80.6 | 10.0 | 20-30 | >90 |

EXAMPLE V

In this examples a multiphase acrylic composite polymer of the composition; first stage, 50 parts butyl acrylate; final stage, 45 parts methyl methacrylate/5 parts ethyl acrylate, is prepared in accordance with the procedure of Example I. The polymer is then incorporated into a polyvinyl chloride composition by the procedure of Example II and is tested for roll release and mill stability at 425° F. with the results as shown in Table VI.

stabilizer 0.8 parts of a glycerol monostearate internal lubricant and 0.2 parts of a fatty acid ester lubricant. Composition B contains 100 parts polyvinyl chloride, 2 parts of the tin stabilizer, 1 part of a low molecular weight polyethylene lubricant and 0.8 parts of the glycerol monostearate internal lubricant and 0.2 parts of the fatty acid ester lubricant. Composition c contains 100 parts polyvinyl chloride, 2 parts of the tin stabilizer, 0.8 parts of the glycerol monostearate internal lubricant and 1.5 parts of the fatty acid ester lubricant. The unmodified composition contains 100 parts polyvinyl Table VI

| Composition | Percent Modifier in Polyvinyl Chloride | Roll Release | | Heat Stability | | Clarity | |
| --- | --- | --- | --- | --- | --- | --- | --- |
| | | At 1½-2 Minutes | At 5 Minutes | Minutes to Color | Relative Stability at 5 Minutes | Percent White Light Transmission | Percent Haze |
| Unmodified Polyvinyl Chloride | | P | P | ¾ | P | 80.0 | 8.8 |
| butyl acrylate// methyl methacrylate/ ethyl acrylate (50//45/5) | 5 | G+ | G+ | 1½-2 | G− | 29.6 | 93.2 |
| | 3 | G+ | G | 1½-2 | G− | 45.5 | 58.7 |
| | 1 | G | G+ | 1½-2 | G+ | | |

EXAMPLE VI

As pointed out above in the specification the processability of polyvinyl halide compositions can be improved with conventional lubricants at the expense of clarity. The following example illustrates the foregoing, comparing a conventional lubricant with a composition of the present invention. Table VII shows polyvinyl halide compositions containing the respective lubricants or modifier. In each instance, roll release is determined after three minutes milling at 425° F., 21/20 rpm. Clarity is determined after seven minutes milling at 350° F., 26/20 rpm and compression molding into ⅛ inch thick sheets. Composition A is polyvinyl chloride modified with the modifier-first stage:

TABLE VII

| Composition | Roll Release | Clarity | |
| --- | --- | --- | --- |
| | | Percent White Light Transmission | Percent Haze |
| Unmodified Polyvinyl Chloride | P− | 87.5 | 6.9 |
| A | E | 87.0 | 4.0 |
| B | E− | 72.5 | 15.1 |
| C | G+ | 51.8 | 35.9 | styrene/butyl acrylate (n-dodecyl mercaptan)// second stage: methyl methacrylate/ethyl acrylate; 36/24 (3%)//36/4. The composition contains 97 parts polyvinyl halide, 3 parts of the modifier; 2.0 parts of a tin chloride, 2 parts of the tin stabilizer, 0.8 parts of the glycerol monostearate internal lubricant and 0.2 parts of the fatty acid ester lubricant.

EXAMPLE VII

In this example, stocks weighing 100 grams are prefluxed for three minutes at 350° F., 26/20 rpm, before milling three minutes at 425° F., 21/20 rpm. Proportions of monomers in the polymer modifier compositions are in parts, unless indicated percentage.

This example shows that the multiphase acrylic composite polymers of composition otherwise according to the present invention, but with a crosslinked first stage are not suitable in the present invention (Table VIII).

EXAMPLE VIII

In this example a multiphase acrylic composite polymer of the composition, first stage, 23 parts butyl acrylate/34.5 styrene/2.16 methyl methacrylate/1.24 ethyl acrylate; final stage, 0.64 parts butyl acrylate/1.96 styrene/34.6 methyl methacrylate/3.8 ethyl acrylate, is prepared in accordance with the procedure of Example I. The polymer is incorporated into a polyvinyl chloride composition by the procedure of Example II and is tested for roll release and mill stability at 425° F. with results substantially the same as those obtained with the composition of Example I, shown in Table I.

TABLE VIII

| Composition of Modifier | | Roll Release | | Mill Stability | | |
|---|---|---|---|---|---|---|
| First Stage | Final Stage | At 1 Minute | At 3 Minutes | Minutes to Color | Color at 3 Minutes | Clarity |
| Styrene/butylacrylate (n-dodecyl mercaptan); 36/24 (3%) | methyl methacrylate/ethylacrylate; 36/4 1½ | E− yellow | E clear | | | |
| butylacrylate. methyl meth-(n-dodecyl mercaptan); 50 (3%) | acrylate/ethylacrylate 45/5 | E | E+ | 1½ | yellow | opaque |
| butyl methacrylate (t-dodecyl mercaptan) 50 (6%) | methyl methacrylate/ethylacrylate 45/5 | G+ | G− | 1¼ yellow + | opaque | |
| butylacrylate/butylene diacrylate; 49.5/0.5 | methyl methacrylate | F+ | P+ | 1½ | yellow + | opaque |
| Unmodified Polyvinyl Chloride | | P | P | 1 | yellow + | clear |

EXAMPLE IX

The modifiers of Examples V and VIII (. 28) are isolated from emulsion by spray drying. The modifier was mixed by hand at 2 phr with an extrusion grade commercial ABS resin and milled at 375° F. (190° C.) on a steam heated laboratory two roll mill at a front roll speed of 26 rpm and rear of 20 rpm until severe sticking or discoloration occurred. A similar experiment was run with an injection grade ABS resin.

| | Extrusion ABS | +2 phr Additive (V) | +2 phr Additive (VIII) | Injection ABS | +2 phr Additive (V) | +2 phr Additive (VIII) |
|---|---|---|---|---|---|---|
| Minutes to Stick | | | | | | |
| Slight | 0.5 | 47 | 108 | 1.5 | 2.0 | 2.5 |
| Severe | 11 | >47 | >108 | 18 | 31 | 35 |

EXAMPLE X

The blend of the polymer of Example VIII with the ABS resins was milled 5 minutes after flux at 350° F. (177° C.), the sheets removed, folded and pressed to 1.8 inch (0.032 cm) plaques at 64,000 kg. pressure at 177° C. Testing was done by standard ASTM methods. There was only a slight diminution in important physical properties.

| Property | Test | Extrusion Resin | +2 phr Additive | Injection Resin | +2 phr Additive |
|---|---|---|---|---|---|
| Impact, notched Izod. 23° C. kg cm/cm | ASTM D-256 | 41.4 | 40.8 | 27.8 | 22.9 |
| Distortion Temp., ° C. | ASTM D-648 | 88 | 88 | 83 | 85 |

EXAMPLE XI

The blend and control of Example X were extruded on a 1 inch (2.54 cm) Killion laboratory extruder with a ½ inch (1.27 cm) diameter pipe die and a 2-stage, high compression ratio, L/D = 24/1 screw at varying melt temperatures. At three melt temperatures (410° F., 430° F. and 450° F. = 210° C., and 232° C.), the blend containing 2 phr additive was superior to the control in absence of surface roughness and die lines, and in higher gloss.

EXAMPLE XII

The modifiers of Example V and VIII are milled at 5 phr with the following thermoplastics.

| Thermoplastic | Milling Temp. ° F. (° C.) | Comments | | |
|---|---|---|---|---|
| | | No Additive | Additive V | Additive VII |
| Chlorinated poly (vinyl chloride)$^a$ | 380 (193) | Stick Time 4 minutes | Stick time 20 minutes | Stick time 20 minutes |
| Cellulose acetate butyrate | 300 (149) | Fair release | — | Good release |
| High impact polystyrene | 320 (160) | Fair release | Improved release | — |

$^a$CPVC 100; Additive 2; tin stabilizer 2; lubricant 1.

EXAMPLE XIII

The modifier of Example VIII was mixed at various levels with polyester chip, spun to fiber at 294° C. and 2060 meter meters/minute. At 2.5% modifier, a pronounced pressure drop in the extruder was noted vs. the control; further drops were noted at the 5% and 7.5% additive level. In both cases, an increased screw speed was required to maintain the desired output rate. The melt temperature could be lowered with the additive present to achieve the same effect, i.e., at 7.5% modifier a drop of 8° C. brought the extruder pressure back to the optimized level.

Fiber of denier similar to the control was obtained; in the untextured form the fiber/additive had only slightly poorer breaking strength values relative to the control.

Physical properties of the textured fiber were measured after knitting into double knit fabric. No significant deleterious effects of fabric properties were noted; and in fact an improvement in snag and pilling was detected on a standard Mace test.

EXAMPLE XIV

A commercially available thermoplastic polyurethane (Cyanoprene 1880 - American Cyanamid) was milled at 340° F. for three minutes; the material fluxed to form a smooth sheet which released very poorly from the mill rolls. When 2.5 parts of the additive of Example I were added, flux time and sheet quality were not affected, but the new sheet now showed good release from the mill.

We claim:

1. A composition comprising a blend of a thermoplastic polymer other than vinyl halide polymers with a multiphase acrylic composite polymer which is solid at room temperature and which comprises:
   (A) about 50 to 90 weight percent of a first noncrosslinked phase of viscosity average molecular weight of about 7,500 to 50,000 polymerized from a first monomer emulsion of at least 25 weight percent of at least one alkyl acrylate wherein said alkyl group has 1 to 18 carbon atoms, and 0 to 75 percent of another copolymerizable ethylenically unsaturated monomer; and
   (B) about 10 to 50 weight percent of a final, rigid thermoplastic phase polymerized in the presence of said first phase from an emulsion or solution of about 35 to 100 weight percent of at least one monomer which is a methacrylate, acrylate, styrene or substituted styrene, 0 to 65 weight percent of another acrylic monomer and 0 to 65 weight percent of another copolymerizable ethylenically unsaturated monomer, wherein the rigid thermoplastic phase has a viscosity average molecular weight of from about 400,000 to $5 \times 10^6$.

2. The composition of claim 1 wherein the thermoplastic polymer is polymerized from at least one monomer selected from the group consisting of acrylonitrile, butadiene, styrene, methyl methacrylate, propylene, and ethylene.

3. The composition of claim 1 wherein the thermoplastic polymer is selected from the group consisting of polyethylene terephthalate, polypropylene terephthalate, and polybutylene terephthalate.

4. The composition of claim 1 wherein the thermoplastic polymer is a polyester.

5. The composition of claim 1 wherein the thermoplastic polymer is polyurethane.

6. The composition of claim 1 wherein the thermoplastic polymer is a polycarbonate or a polycaprolactam.

7. The composition of claim 1 in which said first phase of (A) of said multiphase composite polymer is polymerized from a monomer emulsion or solution of 25 to 95 weight percent of the alkyl acrylate, 35 to 65 weight percent of another acrylic monomer and 35 to 65 percent of another copolymerizable ethylenically unsaturated monomer.

8. The composition of claim 1 in which said rigid thermoplastic phase of said multiphase composite polymer is polymerized from an emulsion or solution of 50 to 90 weight percent of at least one monomer which is a methacrylate, acrylate, styrene or substituted styrene, 5 to 15 weight percent of another acrylic monomer and 5 to 15 weight percent of another copolymerizable ethylenically unsaturated monomer.

9. The composition of claim 1 in which the rigid thermoplastic phase of said multiphase polymer is characterized by a molecular weight of from 750,000 to $1 \times 10^6$.

10. The composition of claim 1 wherein the multiphase composite polymer comprises 50 to 90 weight percent of the first phase and 10 to 50 weight percent of the second phase.

11. The composition of claim 1 wherein the multiphase composite polymer has a first phase polymerized from about 40 parts by weight butyl acrylate, and 60 parts by weight styrene and said second stage polymerized from about 45 parts by weight methyl methacrylate and about 5 parts by weight ethyl acrylate, the ratio of first stage to second stage being about 1.

12. The composition of claim 1 wherein the thermoplastic polymer is ABS.

* * * * *